US007010370B1

(12) United States Patent
Riegelsberger

(10) Patent No.: US 7,010,370 B1
(45) Date of Patent: Mar. 7, 2006

(54) SYSTEM AND METHOD FOR ADJUSTING DELAY OF AN AUDIO SIGNAL

(75) Inventor: Edward Riegelsberger, Fremont, CA (US)

(73) Assignee: Creative Technology, Ltd., Singapore (SG)

( * ) Notice: Subject to any disclaimer, the term of this patent is extended or adjusted under 35 U.S.C. 154(b) by 0 days.

(21) Appl. No.: 09/385,181

(22) Filed: Aug. 30, 1999

(51) Int. Cl.
*G06F 17/00* (2006.01)
*G06F 17/10* (2006.01)
*H03G 3/00* (2006.01)

(52) U.S. Cl. ........................... 700/94; 708/301; 381/63

(58) Field of Classification Search .................. 700/94; 84/63, 707; 381/63, 17, 18, 307, 62, 63, 381/FOR. 102; 704/502; 708/301
See application file for complete search history.

(56) References Cited

U.S. PATENT DOCUMENTS 5,342,990 A 8/1994 Rossum ........................ 84/603
5,457,719 A * 10/1995 Guo et al. .................. 375/373
5,781,461 A * 7/1998 Jaffe et al. .................. 708/301
6,138,207 A * 10/2000 Rossum ...................... 711/118
6,477,255 B1 * 11/2002 Yoshida et al. ............... 381/86

OTHER PUBLICATIONS

Doppler Effect Compensation for Loud Speakers; Anonymous; Mar. 1995 (Research Disclosure RD 371051 A).*

* cited by examiner

*Primary Examiner*—Vivian Chin
*Assistant Examiner*—Andrew Flanders
(74) *Attorney, Agent, or Firm*—Van Pelt, Yi & James LLP

(57) ABSTRACT

A method for adjusting a time delay between a first audio signal and a second audio signal is disclosed. The method includes generating the first audio signal from a buffer as a first data stream and generating the second audio signal from the buffer as a second data stream after an initial time delay. The method further includes receiving the first data stream at a first sample rate converter at a first consumption rate and generating a first output data stream at an output sample rate. The second data stream is received at a second sample rate converter at a second consumption rate and the second sample rate converter generates a second output data stream at the output sample rate. One of the first and second consumption rates are changed so that the time delay between the first and second output data streams is adjusted over time from the initial time delay. A system for adjusting the time delay between a first audio signal and a second audio signal is also disclosed.

17 Claims, 6 Drawing Sheets

SYSTEM AND METHOD FOR ADJUSTING DELAY OF AN AUDIO SIGNAL

FIELD OF THE INVENTION

This invention relates generally to acoustic modeling, and more particularly, to a system and method for adjusting delay of an audio signal.

BACKGROUND OF THE INVENTION

There is a growing interest to improve methods and systems for audio displays that can present audio signals conveying accurate impressions of three dimensional sound fields. The audio display systems utilize techniques that model the transfer of acoustic energy in a sound environment from one point to another. The realism of an acoustic display can be enhanced by including ambient effects. One important effect is caused by reflections. A listener hears the sound not only directly from the source but also as reflections of the sound from nearby objects. In most environments, a sound field comprises sound waves arriving at a particular point, such as a listener's ear, along a direct path from the sound source and along paths reflecting off one or more surfaces of walls, floor, ceiling, and other objects. Sounds cannot only be heard as emanating from a sound source, but also as they are reflected off of walls, leak through doors from an adjoining room, get occluded as they disappear around a corner, or suddenly appear overhead as a listener steps into the open from a room.

Once a sound wave has been emitted, it travels through an environment where several things happen. The sound can travel directly to the listener (direct path), bounce off an object once and then reach the listener (first order reflected path), bounce off two surfaces before reaching the listener (second order reflected path), and so on. Second and higher order reflections usually combine to form late field reflections, or reverb. The direction of arrival for a reflection is generally not the same as that of the direct path sound wave. The propagation path of a reflected sound wave is longer than a direct path sound wave, thus reflections arrive later. In addition, the amplitude and spectral content of a reflection will generally differ because of energy absorbing qualities of the reflective surfaces. Reflections add to the naturalness and immersiveness of the sound field and provide cues to the size, shape, and composition of the acoustic environment.

In addition to the variable propagation delay of reflections, the time at which sounds are heard by a right ear and left ear of a listener varies based on the location of the source of the sound due to interaural time difference (ITD). Interaural time difference refers to the fact that a sound will typically arrive earlier at one ear than at the other ear. If the sound arrives at the left ear first, for example, the listener's brain knows that the sound is somewhere to the left.

The material from which the reflecting object is made affects the way the sound reflects off and transmits through an object. Each time a sound is reflected off of an object, the material of the object has an effect on how much each frequency component of the sound wave is absorbed, and how much is reflected back into the environment. For example, a carpeted room sounds very different from a glass room. An object's material characteristics can be measured empirically by recording known sounds as they bounce off of materials and modeled as a gain value, for example. Wall surface materials and acoustic space geometries are typically stored in a database for use by a sound processor.

Sound processors are designed to simulate the acoustics of an environment relative to a listener. The processor simulates direct path propagation, reflections, and other acoustic effects. For example, effects of reflection and ITD may be synthesized by appropriately delaying the source signal. Individual reflections are typically modeled as copies of an original signal modified with appropriate spectral, positional, and temporal cues. The output is the summation of the individual reflections, direct paths, and other acoustic effects. An example is the simulation of a person talking inside a rectangular room having carpeted walls. The signals include a direct path signal and six first-order reflections (one for each of the four walls, floor, and ceiling). Propagation distance and direction of arrival for the seven signals is determined from information about the acoustic space, including room geometry and source and listener locations. In order to simulate the different propagation distances, each signal is delayed an amount proportional to the propagation distance. Amplitude and spectral cues are added to each signal for propagation effects such as distance, attenuation, and atmospheric absorption. Gain, delay, and spectral effects are added to each signal to provide localization cues based on the direction of arrival of the sound. Pitch of the signals may also vary due to Doppler effects when the listener or source is moving. Reflections also have amplitude and spectral cues added to them based on the reflective properties of the walls. All of these added cues may change continuously due to changes in the simulation or environment (e.g., change in position of source or listener). The output is a summation of the direct path and six reflections, each having different delays, gains, pitch, and spectral effects, which produce the perception of a person talking inside the modeled room.

Conventional audio processors provide the variable delays used to simulate propagation distances by positioning taps (a, b, c) at different locations along a delay line buffer B, located on a host computer, for example (FIG. 1). The input data D enters at the left of the buffer B (as viewed in FIG. 1) and as the data moves to the right, a signal is first output at tap a for the direct path signal after a first delay, to allow for propagation of the signal from the source to the listener. A signal is next output after a second delay at tap b to model a first reflection, and after a third delay, a signal is output at tap c to model a second reflection. As shown in FIG. 1, the output sound signal is created by the summation of direct path and reflection signals. Each time the sound source or listener moves, the location of each tap must also be moved to either increase or decrease the initial delay to compensate for changes in propagation path distances between the sound source and the listener. The location of the tap can vary significantly from its original position. Interpolation is required to smoothly move the taps without audible artifacts. Interpolator output is typically calculated over a window of data samples centered at the desired delay location. Interpolation quality improves as the window width increases, but with proportional increase in computational cost.

The computational cost of performing interpolation, as well as acoustic processing for propagation, reflection, and localization effects for a large number of reflections is significant. While this processing may be performed using special purpose hardware, the amount of special purpose memory required to store the delay lines is high. For example, a one-half second delay at a 48 kHz sampling rate requires the storage of 24,000 samples.

There is, therefore, a need for a system and method of efficiently rendering sound reflections in special purpose hardware with limited memory requirements.

SUMMARY OF THE INVENTION

A method and system for adjusting a time delay between a first audio signal and a second audio signal to provide acoustic rendering is disclosed. The method generally includes generating the first audio signal from a buffer as a first data stream and generating the second audio signal from the buffer as a second data stream after an initial time delay. The method further includes receiving the first data stream at a first sample rate converter at a first consumption rate and generating a first output data stream at an output sample rate and receiving the second data stream at a second sample rate converter at a second consumption rate and generating a second output data steam at the output sample rate. One of the first and second consumption rates is changed so that the initial time delay between the first and second output data streams is adjusted over time to provide an adjusted time delay.

A system for adjusting a time delay between a first audio signal and a second audio signal generally includes a buffer operable to receive an audio signal as a data stream which includes a plurality of samples and transmit the first and second audio samples. The system further includes a first sample rate converter operable to receive the first audio samples from the buffer at a first consumption rate and generate a first output data stream at an output sample rate. A second sample rate converter is provided to receive the second audio samples from the buffer at a second consumption rate and generate a second output data stream at the output sample rate. The system further includes a controller operable to change one of the first or second consumption rates to adjust the time delay between the first output data stream and the second output data stream over time.

The above is a brief description of some deficiencies in the prior art and advantages of the present invention. These and other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

Figure 2:
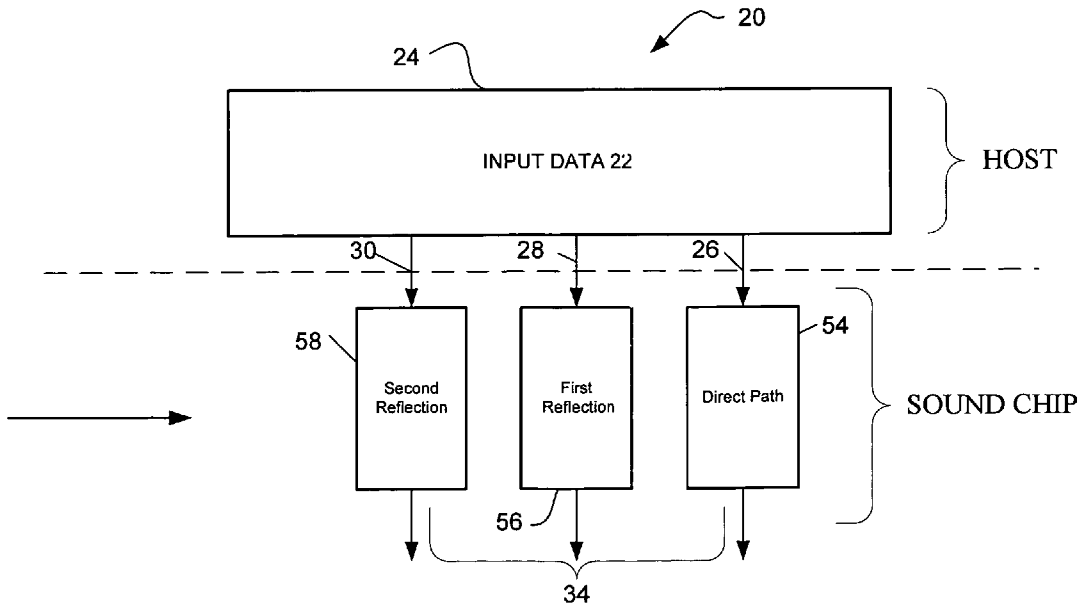
FIG. 2 is a schematic illustrating a system for modeling sound reflections including a delay line located on a host computer and processing blocks located on a sound chip for adjusting the delay of audio signals.

Referring now to the drawings and first to FIG. 2, an embodiment of a sound modeling system is schematically shown and generally indicated at 20. The system 20 receives sampled data which corresponds to an input waveform and outputs an audio signal which conveys impressions of three dimensional sound fields. The system 20 outputs the sound signal as a summation of multiple processed signals which are modified versions of the input sound signal. Each signal is appropriately delayed to represent a path of propagation from a sound source to a listener (e.g., direct path or reflection). The duration of delay for each sound is calculated based on the location of the sound source, the location of the listener and the environment (e.g., location of walls and other objects which can reflect sound). In addition to delaying the signals, the signals are also filtered to account for atmospheric absorption, for example. Reflected signals may be modified in amplitude and spectrum based on the material properties of the object from which the sound is reflected. The signals may also be modified to account for transmission through objects and diffraction around objects. Positional rendering may also be performed to produce two or more output channels to provide the illusion of sound coming from a location in space. In a two-channel output case, such as for presentation over headphones, positional rendering may include interaural time difference (ITD), interaural intensity differences (IID), or convolution with head-related transfer functions, for example. The output summation of system 20 is preferably performed on each channel. It is to be understood that filtering different than described herein may be used to modify the signal and simulate the environment.

The sound signal is input into a delay line (e.g., buffer or queue) 24 on a host computer as a stream of data 22 which includes a plurality of samples at an input rate. The source signal is stored as sampled data which is representative of an input waveform, or other suitable audio data format, on the host computer along with the geometry of the sound environment (e.g., locations of objects, walls, floor, and ceiling) and locations of the source and listener relative to the sound environment. It is to be understood that the sampled data or the geometry of the sound environment may also be stored on a sound card or other special purpose hardware, instead of the host computer. The positioning data is continuously updated to account for movement of the sound source and listener.

Figure 1:
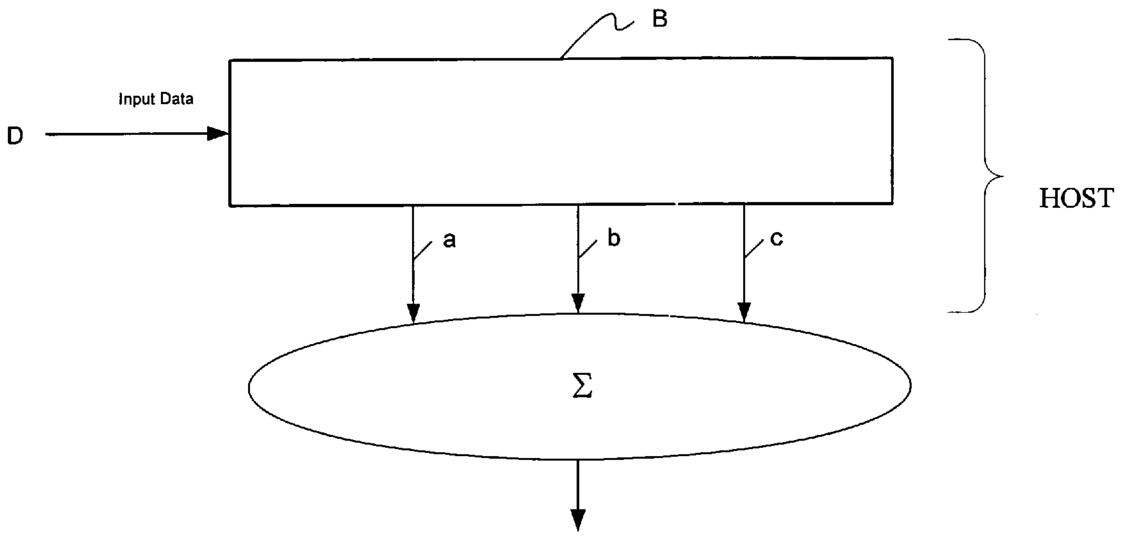
FIG. 1 PRIOR ART
FIG. 1 is a schematic illustrating a prior art tapped delay line having movable taps positioned along the delay line for providing a delay of audio signals output from a host computer.

The delay line 24 includes a plurality of non-interpolating taps 26, 28, 30 which stream delay line signal samples sequentially to a sound chip. For simplification, the operation of the delay line will be described in terms of a fixed buffer of data with a plurality of taps moving through the buffer, rather than a queue with fixed taps having data moving through the queue as previously described with respect to FIG. 1. FIG. 2 schematically shows the delay line 24 comprising a fixed buffer of data 22. The taps 26, 28, 30 move through the buffer of data (left to right as viewed in FIG. 2) and stream data from the buffer to the sound chip. Tap 26 corresponds to the direct path and taps 28 and 30 correspond to first and second reflections. Taps 28 and 30 are spaced from tap 26 a sufficient number of sample points to provide a time delay corresponding to the additional path length traveled by the reflected sound. At the start of the sound wave, the direct path tap 26 is located at or near the beginning of the delay line buffer 24 and taps 28, 30 are located before the beginning of the buffer. The reflection taps 28, 30 may be located in a preceding buffer of zeros or the taps may not be created until they are located within the buffer, for example.

The number of taps may increase over time to account for new objects or surfaces which are introduced into the sound environment and result in additional reflections, or decrease when a sound wave no longer reflects off an object, due to a listener leaving a room, for example. In order to provide a smooth transition as new reflections are added or old reflections are removed, the volume is preferably ramped up from a low volume (e.g., zero) to the required volume level when a new tap is added and the volume is ramped down to a low volume before a tap is removed. The new taps may be added directly between existing taps as they move along the buffer of data, rather than being placed at the beginning of the buffer. Preferably, the number of taps are kept to a minimum by using appropriate resource management tools to select certain reflections to model while eliminating other less significant reflections. Resource management may be used to selectively add, remove, or swap out reflections as required during modeling of a sound wave to provide high quality modeling while limiting the required resources.

It is to be understood that the number of taps and positioning of the taps may be different than shown herein without departing from the scope of the invention. The taps may also be used to provide a delay to model various other audio effects.

Figure 3:
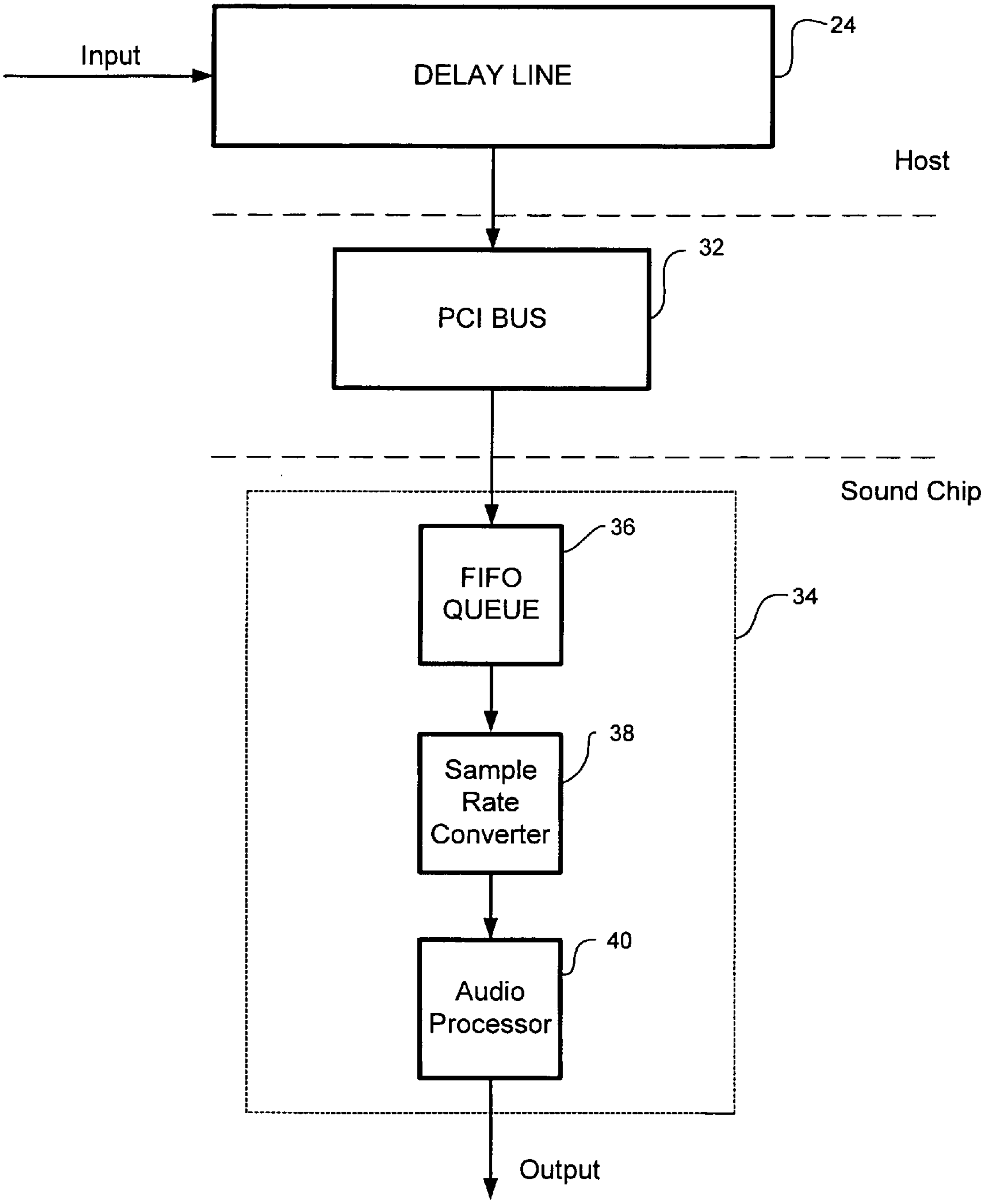
FIG. 3 is a schematic illustrating additional components of the system of FIG. 2.

The data is streamed from the delay line 24 at the locations of the taps 26, 28, 30 through a bus 32 (e.g., PCI bus) to a plurality of processing blocks 34 located on the sound chip (FIGS. 2 and 3). Each processing block (54–58) receives data from a different tap point (26, 28, or 30) on the delay line 24. For example, processing block 54 receives data from tap point 26, processing block 56 receives data from tap point 28, and processing block 58 receives data from tap point 30. The processing block 34 includes a First-In/First-Out (FIFO) queue 36, a sample rate converter 38, and an audio processor 40 which modifies the signal to simulate effects such as attenuation, absorption, and environmental and positional effects. Gains are calculated in a geometry engine based on environment and position data and applied to the signal as it is passed through the audio processor 40. The sample rate converter 38 operates in conjunction with the delay line 24 as a time delay device which either increases or decreases the time delay of the output signals relative to the other signals output from the delay line 24, as further described below. The audio processor 40 and the sample rate converter 38 may be located together on a single chip, for example. The FIFO queue 36, sample rate converter 38, and audio processor 40 are preferably located on a single sound card which outputs a signal to a set of speakers or headphones.

It is to be understood that the arrangement of components within the system may be different than shown and described herein without departing from the scope of the invention. For example, the delay line 24 may be located on the sound card in which case the FIFO queue 36 may be eliminated. In this case the sample rate converter 38 can pull data samples directly off the delay line as required.

The FIFO queue 36 contains the most recent samples of the input signal which were tapped off of the delay line 24 and streamed through the bus 32. The queue 36 holds a plurality of samples of data so that the sample rate converter 38 has a number of samples available to it for performing interpolation. The sample rate converter 38 pulls data from the queue 36 as it needs additional data and as the queue gets low it pulls additional data samples from the delay line 24. The FIFO queue 36 holds a sufficient number of data samples so that it can provide data to the sample rate converter 38 whenever the converter needs additional samples. The rate at which the sample rate converter 38 loads data from the queue 36 (consumption rate) is dependent on the input sample rate as well as the current rate of delay change, as further described below.

The sample rate converter 38 converts the input data stream comprising a plurality of input samples at one sample rate to an output data stream comprising a plurality of output samples at a different sample rate. The sample rate is converted to provide a constant output frequency at the sample rate converter 38, for example. The sample rate converter 38 includes an interpolation filter to allow for the instantaneous value of the signal to be determined at any arbitrary point between samples, as is necessary when a different sampling rate is introduced due to the non-coincidence of sample times within the converter. The interpolation filter preferably allows for arbitrary changes in the sampling rate. The interpolation filter may use linear interpolation, second order interpolation, cubic interpolation, or any other appropriate interpolation method as well known to those skilled in the art. The sample rate converter 38 operates in conjunction with the delay line 24 to provide a specified delay to the audio stream to model reflections, as further described below.

The following describes a method for controlling the time delay of the audio stream as it passes through the system 20. The time delay is first defined and a method for measuring the delay is described. The method used to vary the delay is next described and followed with specific examples showing different delay times.

Delay, in the context of the reflection processing described herein, is a relative term that allows for comparison of the current location of a tap in the delay line buffer 24 to a desired location. In the following description, delay is defined relative to a hypothetical zero-delay tap moving through the buffer at the buffer sample rate. Direct path and reflection signals will lag behind this zero-delay tap according to their respective propagation delays. Delay may also be defined relative to another tap moving through the buffer instead of a hypothetical zero-delay tap. Delay at a time t, may be expressed as:

Delay (t) = Number of Samples Output(t)/Output Sample Rate − Number of Samples Consumed(t)/Buffer Sample Rate where:

Number of Samples Output(t) = the number of samples output over a specified period of time;
Output Sample Rate = the sampling rate of the data stream at the output of the sample rate converter;
Number of Samples Consumed(t) = the number of samples input to the sample rate converter over the specified time period; and
Buffer Sample Rate = sampling rate of input data stream.

The first quotient (Number Samples Output(t)/Output Sample rate) represents the location of the zero-delay tap in the buffer relative to a starting point and time such as the beginning of the buffer. The second quotient (Number of Samples Consumed(t)/Buffer Sample rate) represents the tap for which the delay is being defined.

The Number of Samples Output(t) may be the number of samples output by the sample rate converter from time to $t_0$ time t, in which case:

$$\text{Number of Samples Output}(t)=\text{Output Sample Rate}\times(t-t_0).$$

The Number of Samples Output may be measured by reading a counter register of the sample rate converter 38, for example.

The Number of Samples Consumed(t) may be the number of samples input to the sample rate converter from time to $t_0$ time t, in which case it is a function of the sample rate converter step size over the interval from $t_0$ to t:

$$\text{Number Samples Consumed }(t) = \text{Output Sample Rate }\times\int_{t_0}^{t}\text{Step Size}(\tau)d\tau.$$

The Number of Samples Consumed(t) may be determined by measuring the location of the tap in the delay line buffer 24 relative to the location at time to and the number of samples remaining in the FIFO queue 36.

The rate of consumption of the input data stream into the sample rate converter 38 (i.e., the rate at which data is pulled from the FIFO queue 36 and input into the sample rate converter 38 (# samples/second)) is adjusted to provide the required increase or decrease in delay of the signal. The rate of consumption is controlled by varying a step size used to convert sample rates within the sample rate converter 38. By increasing or decreasing the step size, a delay can be subtracted or added over time. Step size at time t may be calculated as follows:

Step Size(t) = Base Step Size + ΔStep Size(t)
where:
Base Step Size is a constant value used to convert the input sample rate to the output sample rate and is equal to:
Buffer Sample Rate/Output Sample Rate; and
ΔStep Size(t) is a change in step size used to alter the delay.

For example, if the buffer is sampled at 24 kHz and the sample rate converter output rate is 48 kHz, the Base Step Size is equal to 0.5. By changing the term ΔStep Size(t) to increase or decrease the Step Size, a delay can be subtracted or added over time. Changing the ΔStep Size(t), thus changes the delay as follows:

$$\Delta\text{Delay} = \text{Delay}(t_2) - \text{Delay}(t_1) = -\text{Output Sample Rate}/\text{Buffer Sample Rate}\times\int_{t_1}^{t_2}\Delta\text{Step Size}(\tau)d\tau$$

If the data is continuously output from the sample rate converter 38 at a constant sampling frequency, a change in step size results in a change in consumption rate of the data. The sample rate converter 38 is thus operable to vary the rate of consumption of data from the FIFO queue 36 into the sample rate converter by adjusting the ΔStep Size of the sample rate converter.

Figure 4A:
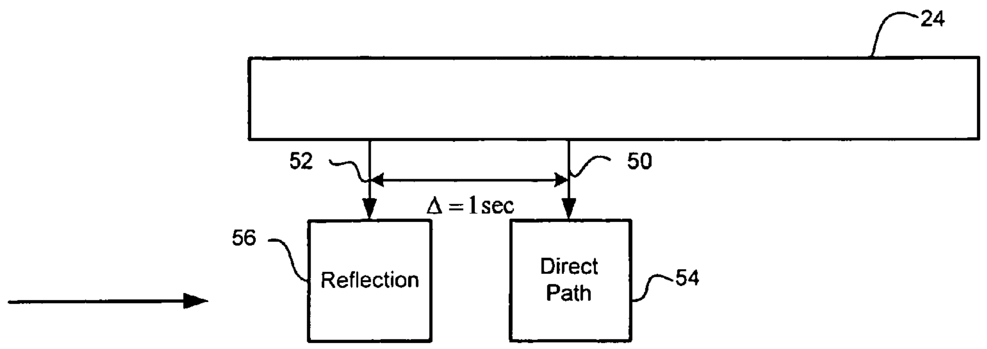
FIG. 4A is a schematic illustrating a direct path signal and a reflection signal having a one second output delay from the direct path signal.
Figure 4B:
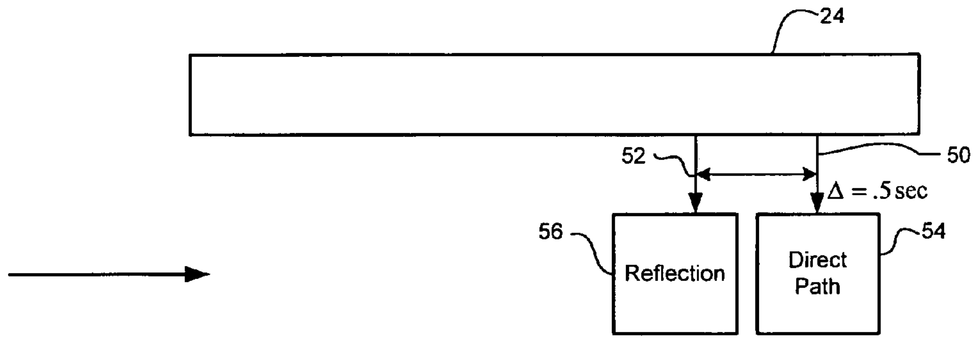
FIG. 4B is a schematic illustrating a direct path signal and a reflection signal having a one-half second output delay from the direct path signal.
Figure 4C:
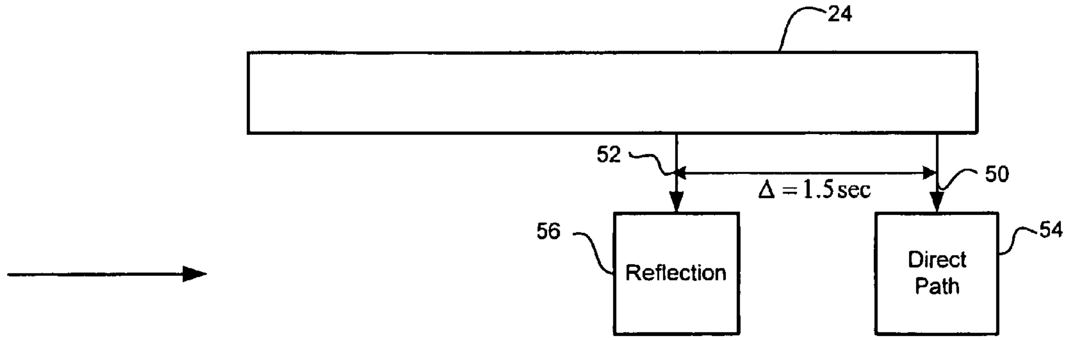
FIG. 4C is a schematic illustrating a direct path signal and a reflection signal having a one and one-half second output delay from the direct path signal.

FIGS. 4A–4C illustrate how the delay is changed by varying the step size. FIG. 4A shows delay line 24 having a direct path tap 50 and a reflection tap 52 separated by a 1.0 second delay. Each tap moves through the buffer at a rate determined by the step size of their respective sample rate converter. For example, if the output sample rate is 48 kHz and the buffer sample rate is 24 kHz, both taps have a Base Step Size of 0.5 and are separated by approximately 24,000 samples. In FIG. 4A the ΔStep Size(t) is zero for both taps 50 and 52, thus, overtime the two taps will remain 1.0 second and 24,000 samples apart.

In FIG. 4B, the delay between the direct path tap 50 and reflection tap 52 is reduced by 0.5 seconds. This is accomplished by increasing the step size of the reflection sample rate converter 56 from 0.5 to 0.75 to speed up the rate of consumption from 24 kHz to 36 kHz. The Base Step Size is still 0.5 for both taps. However, the ΔStep Size for the reflection tap 52 has been increased to 0.25. After one second has passed, the overall delay between output of the direct path 50 and the reflection tap 52 from the system will be 0.5 seconds.

FIG. 4C illustrates an increase in delay between the direct path signal 50 and the reflected signal 52 of 0.5 seconds from the example shown in FIG. 4A. The rate of consumption at the reflection sample rate converter 56 is reduced to 12 kHz by decreasing the step size from 0.5 to 0.25. After one second has passed, the reflected signal 52 will be output from the system 1.5 seconds after the output of the direct path signal 50.

During operation of the system, after the sound wave is started through the delay line 24, locations of the taps are compared to their desired location as determined by a desired delay. The desired delay is calculated in the host, based on information from the geometry engine, for example. If the delay provided by the delay line 24 is different than the desired delay, the step size of the sample rate converter 38 is adjusted to either increase or decrease the overall delay between the time the signal is input to the delay line buffer 24 and output from the processing block 34 (FIG. 3). The step size and rate of consumption are controlled by a feedback system which compares an actual delay of the signal by the system 20 to the desired delay. The step size is then adjusted within constraints on the allowable range of consumption rates to change the actual delay to the desired delay while limiting delay overshoot and oscillation, and preventing long term drift.

Figure 5:
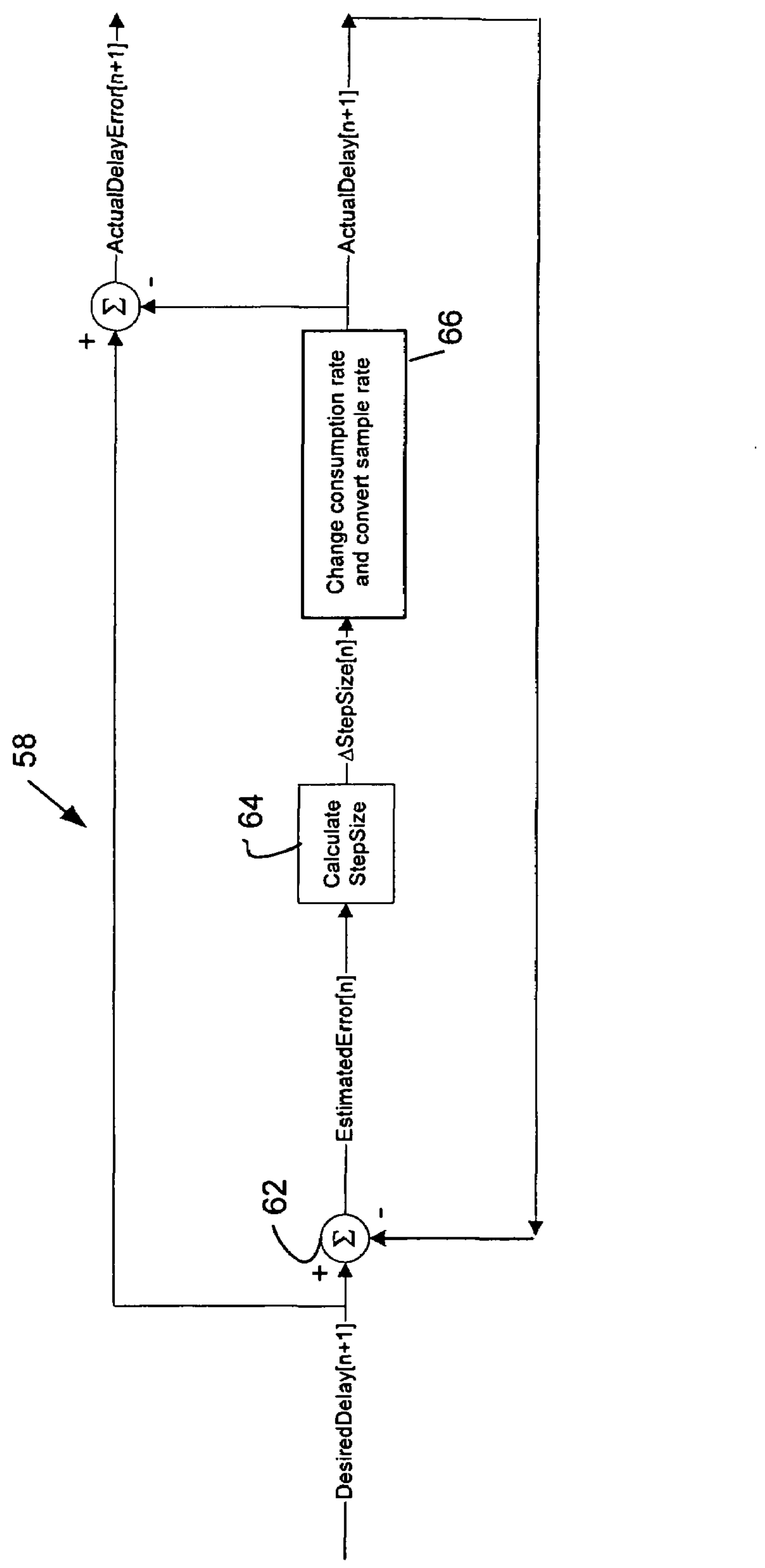
FIG. 5 is a schematic illustrating a feedback control system for the sound modeling system of FIG. 2.
Figure 6:
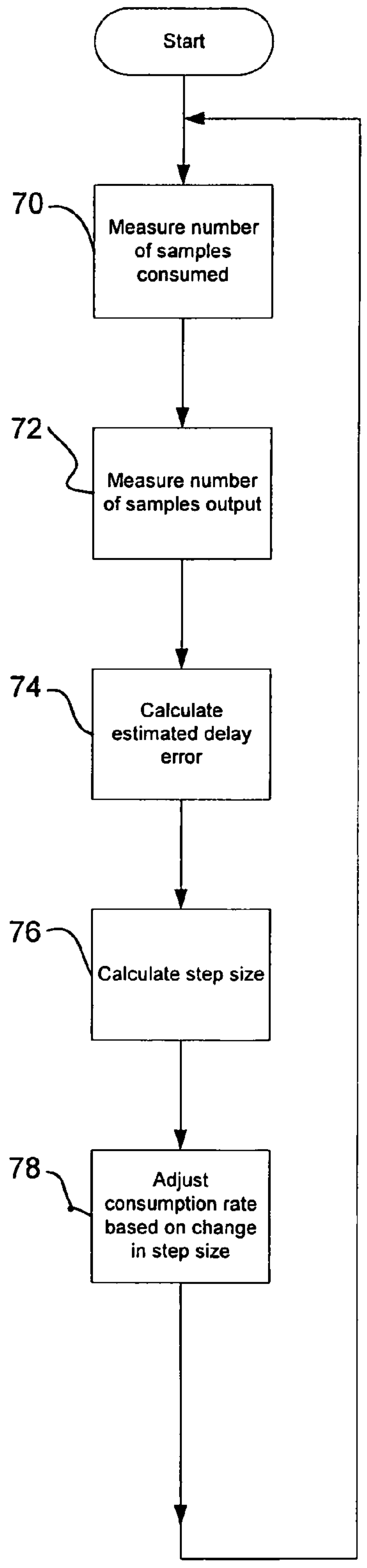
FIG. 6 is a flowchart illustrating processing steps of the control system of FIG. 5.

One embodiment of a feedback control system, generally indicated at 58, is shown schematically in FIG. 5, with processing steps of the control system shown in the flowchart of FIG. 6. The host measures the delay of the output signal at set intervals (interrupt interval), compares this value with the desired delay and reprograms the sample rate converter 38 to adjust the consumption rate as required. If the desired delay is greater than the actual delay, the host will send a message to the sample rate converter 38 to slow down the consumption rate of the data. If the desired delay is smaller than the actual delay, the host will send a message to the sample rate converter 38 to speed up the consumption rate. The measurement of the delay and calculation of the desired delay is performed continuously at the interrupt interval (e.g., every 0.01 second). Measurement and correction of the delay should occur sufficiently often to minimize overshoot of the desired delay since the sample rate converter 38 is instructed to speed up or slow down the consumption rate without providing a time frame over which to apply this correction. Thus, if the host does not check the delay and adjust the delay as required, the correction will continue to be applied and the delay will overshoot the correct value.

The following describes the control system shown in FIG. 5 with reference to the processing steps of the flowchart shown in FIG. 6. At each interrupt interval n, the host measures the actual delay for a particular tap by measuring the number of samples consumed by the sample rate converter 38, step 70 and the number of samples output by the sample rate converter, step 72. Actual delay is calculated from the measurements for number of samples output, output sample rate, number of samples consumed, and buffer sample rate, according to the above described equations. To reduce computational overhead, the number of samples output can be calculated less frequently, however, the estimation error will increase. The difference between the desired delay and the actual delay is the estimated delay error, step 74 (summation 62 of FIG. 5). The estimated delay error is used to calculate the step size, step 76 (block 64 of FIG. 5). The controller adjusts the consumption rate of the sample rate converter based on the new step size, step 78 (block 66 of FIG. 5). Audio processing continues with the new step size until it is reprogrammed at the next interrupt interval. The feedback control process is preferably performed for each tap at each interrupt interval. While the number of samples consumed must be measured for each tap, the number of samples consumed need only be measured once per interrupt interval. To reduce the cost of feedback control computations, the interrupt interval may be reduced, however, the estimation error will increase.

The calculation of step size is preferably performed periodically to reduce the delay error. The control system 58 monitors progress after a predetermined period of time has passed. If error has been reduced to zero, the consumption rate is returned to its original value. If the processor overshoots or undershoots the desired delay, the control system 58 must reprogram the consumption rate to further reduce the delay error. The control system 58 is designed to reduce the error as quickly as possible, without significant overshoot or long-term drift, while limiting the maximum change in consumption rate to prevent objectionable Doppler effects.

Figure 7:
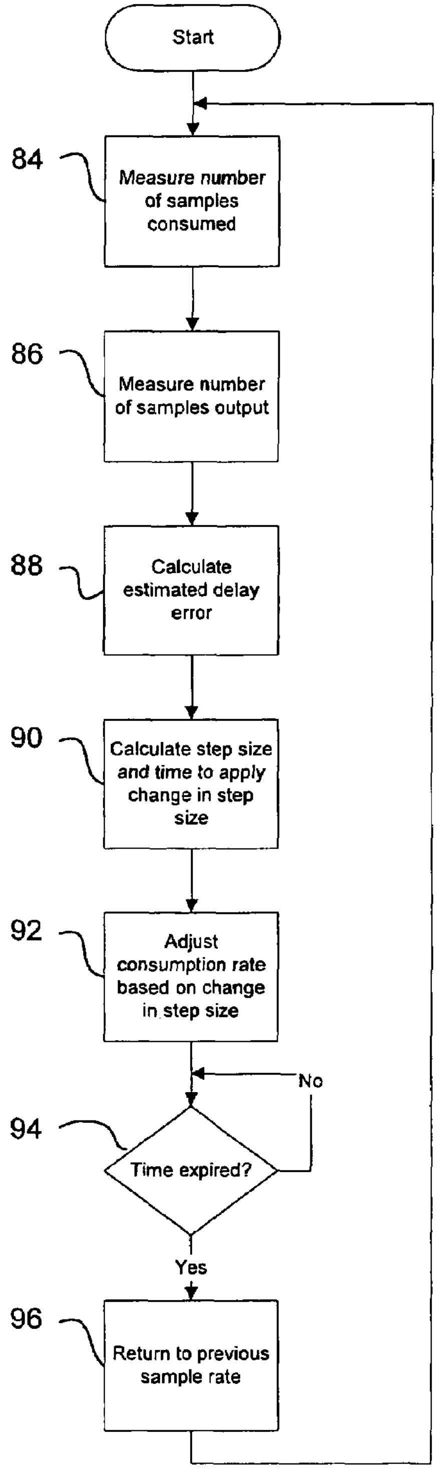
FIG. 7 is a flowchart illustrating processing steps of an alternative control system.

Processing steps for a second embodiment of the control system is shown in FIG. 7. The control system is similar to the first embodiment described above except that the sample rate converter is designed to add or subtract an exact amount of delay at a given rate. The sample rate converter 38 is programmed with Base Step Size, the delay error and the maximum delta step size. The sample rate converter automatically calculates $\Delta$Step Size(t) to drive the delay error to zero, within the constraints of the maximum delta step size. The control system periodically remeasures the delay error to detect any changes in desired delay and compensate for any drift in the delay error minimization. Since the control system no longer has to worry about overshoot, its update rate can be much slower (e.g., 0.1 second) than described above for the first embodiment. As illustrated in the flowchart of FIG. 7, the host calculates the delay error (steps 84–88), but instead of changing the step size of the sample rate converter, it sets the delay error of the sample rate converter and lets the converter reduce the delay error to zero over time (steps 90 and 92). The sample rate converter is designed to adjust its sample rate to compensate for the delay and then bring it back to its original sample rate after a set period of time (steps 94 and 96). This set period of time is calculated based on how large the error is and by how much the sample rate must be increased or decreased to eliminate the error. The control system therefore assumes the error was corrected without providing feedback to check whether it was actually corrected. The process will be repeated at the next interrupt interval (not shown) and the actual delay will be measured.

It is to be understood that a control system different than those described herein may be used to monitor and adjust the time delay of the signals, without departing from the scope of the invention. Allocation of the steps of FIGS. 6 and 7 to hardware of the host computer, the sound card, or special purpose hardware may be made based on processing availability and other considerations, as is well known by those skilled in the art.

While the system 20 has been described with respect to modeling reflections, the system may also be used for other special purpose applications such as reverberator applications, for example.

The delay line 24 may also be used to create interaural time differences (ITD) due to differences in the time it takes sound to reach the left ear and the time it takes for the sound to reach the right ear. At each tap location, a pair of taps may be provided one for each ear, to account for ITD. Since ITD values are relatively small (e.g., <1 msec), the requirement of the feedback control mechanisms described below are stricter than for reflections. It is to be understood that changes in the signal to account for ITD can also be performed in an audio processor to reduce the number of taps on the delay line 24.

In view of the above, it will be seen that the several objects of the invention are achieved and other advantageous results attained. As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of adjusting a time delay between a first audio signal and a second audio signal, the method comprising:

generating the first audio signal from an input audio signal stored in a buffer as a first data stream;

generating the second audio signal from the input audio signal stored in the buffer as a second data stream after an initial time delay;

receiving the first data stream at a first sample rate converter at a first consumption rate and generating a first output data stream at an output sample rate; and receiving the second data stream at a second sample rate converter at a second consumption rate and generating a second output data stream at the output sample rate; and changing one of the first and second consumption rates so that the initial time delay between the first and second output data streams is adjusted over time to provide an adjusted time delay, wherein the first and second output data streams are used to simulate the input audio signal propagating through an environment by a first path associated with the first output data stream and a second path associated with the second output data stream.

2. The method of claim 1 wherein the first data stream represents a direct path signal and the second data stream represents a reflected signal, and further comprising calculating the adjusted time delay based on the difference between propagation delay of the direct path signal and the reflected signal.

3. The method of claim 1 wherein the buffer is located on a host computer and wherein receiving the first and second data streams comprises receiving the data streams on a sound card.

4. The method of claim 1 wherein receiving the first and second data streams comprises interpolating data samples of the data streams to convert the consumption rates to the output sample rate.

5. The method of claim 1 wherein changing the consumption rate comprises increasing the rate to decrease the time delay.

6. The method of claim 1 wherein changing the consumption rate comprises decreasing the rate to increase the time delay.

7. The method of claim 1 further comprising changing both the first and second consumption rates.

8. The method of claim 1 wherein the first and second consumption rates are approximately the same prior to changing one of the consumption rates.

9. The method of claim 1 wherein changing the consumption rate comprises measuring the adjusted time delay, comparing it to a desired delay, and adjusting the rate of consumption until the measured output time delay matches the desired delay.

10. The method of claim 9 wherein adjusting the consumption rate comprises providing continuous feedback and correcting the consumption rate as required.

11. The method of claim 9 wherein adjusting the consumption rate comprises increasing or decreasing the rate for a set period of time to correct error in the measured delay.

12. A system for adjusting a time delay between a first audio signal and a second audio signal, the system comprising:

a buffer operable to receive an input audio signal as a data stream which includes a plurality of samples and transmit first and second audio samples; and a first sample rate converter operable to receive the first audio samples from the buffer at a first consumption rate and generate a first output data stream at an output sample rate;

a second sample rate converter operable to receive the samples from the second audio samples from the buffer at a second consumption rate and generate a second output data stream at the output sample rate; and a controller operable to change one of the first and second consumption rates to adjust a time delay between the first output data stream and the second output data stream over time, wherein the first and second output data streams are used to simulate the input audio signal propagating through an environment by a first path associated with the first output data stream and a second path associated with the second output data stream.

13. The system of claim 12 wherein the buffer is located on a host computer and the sample rate converters are located on a sound card.

14. The system of claim 12 wherein the first and second audio samples are output from the buffer with an initial time delay therebetween.

15. The system of claim 12 further comprising a queue configured to receive the samples from the buffer and transmit the samples to the sample rate converters.

16. The system of claim 12 wherein the controller is configured to measure the time delay, compare it to a desired delay, and adjust one of the first and second consumption rates until the measured time delay matches the desired delay.

17. The system of claim 16 further comprising a feedback system for providing continuous feedback to the controller and correcting the consumption rate as required.

* * * * *